(12) United States Patent
Cao et al.

(10) Patent No.: US 10,447,912 B2
(45) Date of Patent: Oct. 15, 2019

(54) SYSTEMS, METHODS, AND DEVICES FOR SETTING CAMERA PARAMETERS

(71) Applicant: SZ DJI TECHNOLOGY CO., LTD., Shenzhen (CN)

(72) Inventors: Zisheng Cao, Shenzhen (CN); Linchao Bao, Shenzhen (CN); Paul Pan, Shenzhen (CN); Chenglin Mao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 154 days.

(21) Appl. No.: 15/468,055

(22) Filed: Mar. 23, 2017

(65) Prior Publication Data

US 2017/0195549 A1    Jul. 6, 2017

Related U.S. Application Data

(63) Continuation of application No. PCT/CN2015/092344, filed on Oct. 20, 2015.

(51) Int. Cl.
| | |
|---|---|
| *H04N 7/18* | (2006.01) |
| *H04N 5/232* | (2006.01) |
| *G06T 7/20* | (2017.01) |
| *G03B 15/00* | (2006.01) |
| *G03B 37/00* | (2006.01) |

(52) U.S. Cl.
CPC ....... *H04N 5/23212* (2013.01); *G03B 15/006* (2013.01); *G06T 7/20* (2013.01); *H04N 5/23296* (2013.01); *G03B 37/00* (2013.01); *G03B 2205/0007* (2013.01); *G06T 2207/10032* (2013.01); *G06T 2207/30232* (2013.01)

(58) Field of Classification Search
CPC ...................................................... G06T 11/60

USPC .................................................. 348/142–160
See application file for complete search history.

(56) References Cited

U.S. PATENT DOCUMENTS

| | | |
|---|---|---|
| 5,422,828 A | 6/1995 | Choate et al. |
| 6,130,705 A | 10/2000 | Lareau et al. |

(Continued)

FOREIGN PATENT DOCUMENTS

| | | |
|---|---|---|
| CA | 2422459 A1 | 9/2004 |
| CN | 101872105 A | 10/2010 |

(Continued)

OTHER PUBLICATIONS

International search report and written opinion dated Jul. 26, 2016 for PCT Application No. PCT/CN2015/092344.

*Primary Examiner* — Anand S Rao
(74) *Attorney, Agent, or Firm* — Anova Law Group, PLLC

(57) ABSTRACT

Systems, methods, and devices for setting camera parameters are provided. In one aspect, a system for imaging a target object using an imaging device carried by a movable object comprises: one or more sensors configured to detect motion information for the movable object; and one or more processors configured to: receive, from the one or more sensors, the motion information for the movable object; determine, based on the motion information, a change in a spatial relationship between the movable object and the target object; and modify one or more parameters of the imaging device based on the determined change in the spatial relationship between the movable object and the target object such that the imaging device is focused on the target object.

20 Claims, 12 Drawing Sheets

(56) References Cited

U.S. PATENT DOCUMENTS

| | | |
|---|---|---|
| 8,938,160 B2 | 1/2015 | Wang |
| 2014/0037278 A1 | 2/2014 | Wang |
| 2015/0156385 A1 | 6/2015 | Wang |
| 2016/0117853 A1* | 4/2016 | Zhong .................. B64C 39/024 345/634 |

FOREIGN PATENT DOCUMENTS

| | | |
|---|---|---|
| CN | 102428347 A | 4/2012 |
| CN | 104823018 A | 8/2015 |
| JP | H09297261 A | 11/1997 |
| JP | 2001359083 A | 12/2001 |
| JP | 2004040514 A | 2/2004 |
| JP | 2006027448 A | 2/2006 |
| WO | WO-2013033924 A1 | 3/2013 |
| WO | WO-2013033925 A1 | 3/2013 |
| WO | WO-2014171251 A1 | 10/2014 |
| WO | WO-2015085483 A1 | 6/2015 |
| WO | WO-2016015251 A1 | 2/2016 |

* cited by examiner

SYSTEMS, METHODS, AND DEVICES FOR SETTING CAMERA PARAMETERS

CROSS-REFERENCE

This application is a continuation application of International Application No. PCT/CN2015/092344, filed on Oct. 20, 2015, which is incorporated herein by reference in its entirety.

BACKGROUND

Unmanned vehicles such as unmanned aerial vehicles (UAVs) can be used for performing surveillance, reconnaissance, and exploration tasks for a wide variety of civilian, commercial, and military applications. A UAV may be manually controlled by a remote user, or may operate in a semi-autonomous or fully autonomous manner. Such UAVs can be used to carry imaging devices such as cameras for obtaining image data of a target object.

Prior approaches for setting parameters of imaging devices carried by a UAV may not be optimal in some instances. For example, prior methods for focusing imaging devices may not be adapted for situations where the UAV is in motion, which may reduce the quality of the resultant image data.

SUMMARY

The present disclosure provides systems, methods, and devices related to the control and operation of imaging devices carried by a movable object such as an unmanned aerial vehicle (UAV). In some embodiments, the systems, methods, and devices described herein detect motion of the UAV using one or more sensors, and use the detected motion as a basis for modifying one or more parameters of an imaging device carried by the UAV so that the imaging device is focused on a target object. Advantageously, this approach permits the imaging device to remain focused even as the UAV moves relative to the target object, thus improving the quality of the resultant image data, as well as enhancing the flexibility and convenience of performing imaging with a UAV.

In one aspect, a system for imaging a target object using an imaging device carried by a movable object is provided. The system comprises: one or more sensors configured to detect motion information for the movable object; and one or more processors configured to: receive, from the one or more sensors, the motion information for the movable object; determine, based on the motion information, a change in a spatial relationship between the movable object and the target object; and modify one or more parameters of the imaging device based on the determined change in the spatial relationship between the movable object and the target object such that the imaging device is focused on the target object.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial relationship between the movable object and the target object comprises a distance between the movable object and the target object. In some embodiments, the one or more processors are further configured to determine the distance between the movable object and the target object.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, the one or more processors are further configured to receive an initial value for each of the one or more parameters. In some embodiments, the initial value is input by a user. In some embodiments, the initial value is input by the user via a remote terminal in communication with the movable object. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the change in spatial relationship is determined based on the tracking information. In some embodiments, the tracking information is generated based on image data of the target object.

In some embodiments, the one or more processors are further configured to generate image data of the target object using the imaging device with the one or more modified parameters.

In another aspect, a method for imaging a target object using an imaging device carried by a movable object is provided. The method comprises: detecting, using one or more sensors, motion information for the movable object; determining, based on the motion information and with aid of one or more processors, a change in a spatial relationship between the movable object and the target object; and modifying, with aid of the one or more processors, one or more parameters of the imaging device based on the determined change in the spatial relationship between the movable object and the target object such that the imaging device is focused on the target object.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types.

In some embodiments, the method further comprises processing sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial relationship between the movable object and the target object comprises a distance between the movable object and the target object. In some embodiments, the method further comprises determining the distance between the movable object and the target object.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, the method further comprises receiving an initial value for each of the one or more parameters. In some embodiments, the initial value is input by a user. In some embodiments, the initial value is input by the user via a remote terminal in communication with the movable object. In some embodiments, wherein the one or more parameters comprise a focus, and the initial value of the focus is determined using an autofocusing method.

In some embodiments, the target object is stationary.

In some embodiments, the target object is moving. In some embodiments, the method further comprises receiving tracking information indicative of movement of the target object relative to the movable object, wherein the change in spatial relationship is determined based on the tracking information. In some embodiments, the tracking information is generated based on image data of the target object.

In some embodiments, the method further comprises generating image data of the target object using the imaging device with the one or more modified parameters.

In another aspect, an imaging device carried by a movable object for imaging a target object is provided. The imaging device comprises: one or more processors configured to: receive, from one or more sensors mounted on or in the movable object, motion information for the movable object; determine, based on the motion information, a change in a spatial relationship between the movable object and the target object; and modify one or more parameters of the imaging device based on the determined change in the spatial relationship between the movable object and the target object such that the imaging device is focused on the target object.

In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial relationship between the movable object and the target object comprises a distance between the movable object and the target object. In some embodiments, the one or more processors are further configured to determine the distance between the movable object and the target object.

In some embodiments, the imaging device further comprises an optical assembly and an image sensor, wherein the one or more parameters comprise a distance between an optical center of the optical assembly and the image sensor.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the one or more processors are further configured to receive an initial value for each of the one or more parameters. In some embodiments, the initial value is input by a user. In some embodiments, the initial value is input by the user via a remote terminal in communication with the movable object. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the change in spatial relationship is determined based on the tracking information. In some embodiments, the tracking information is generated based on image data of the target object.

In some embodiments, the one or more processors are further configured to generate image data of the target object according to the one or more modified parameters.

In another aspect, an imaging device for imaging a target object is provided. The imaging device comprises: one or more sensors configured to detect motion information for the imaging device; and one or more processors configured to: receive, from the one or more sensors, the motion information for the imaging device; determine, based on the motion information, a change in a spatial relationship between the imaging device and the target object; and modify one or more parameters of the imaging device based on the determined change in the spatial relationship between the imaging device and the target object such that the imaging device is focused on the target object.

In some embodiments, the imaging device is carried by a movable object. In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial relationship between the imaging device and the target object comprises a distance between imaging device and the target object. In some embodiments, the one or more processors are further configured to determine the distance between the imaging device and the target object.

In some embodiments, the imaging device further comprises an optical assembly and an image sensor, wherein the one or more parameters comprise a distance between an optical center of the optical assembly and the image sensor.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the one or more processors are further configured to receive an initial value for each of the one or more parameters. In some embodiments, the initial value is input by a user. In some embodiments, the initial value is input by the user via a remote terminal in communication with the imaging device. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the change in spatial relationship is determined based on the tracking information. In some embodiments, the tracking information is generated based on image data of the target object.

In some embodiments, the one or more processors are further configured to generate image data of the target object according to the one or more modified parameters.

In another aspect system for imaging a target object using an imaging device carried by a movable object is provided. The system comprises: one or more sensors configured to detect motion information for the movable object; and one or more processors configured to: receive, from the one or more sensors, the motion information for the movable object; determine, based on the motion information, a change in a spatial disposition of the movable object; and modify one or more parameters of the imaging device based on the determined change in the spatial disposition of the movable object such that the imaging device is focused on the target object.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial disposition comprises a position of the movable object with respect to three degrees of freedom and an orientation of the movable object with respect to three degrees of freedom.

In some embodiments, the spatial disposition comprises one or more of: a longitude, a latitude, an altitude, a roll angle, a pitch angle, or a yaw angle of the movable object.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, in the one or more processors are further configured to receive an initial value for each of the one or more parameters. In some embodiments, the initial value is input by a user. In some embodiments, the initial value is input by the user via a remote terminal in communication with the movable object. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the one or more parameters are modified based on the tracking information. In some embodiments, the tracking information is generated based on image data of the target object.

In some embodiments, the one or more processors are further configured to generate image data of the target object using the imaging device with the one or more modified parameters.

In another aspect, a method for imaging a target object using an imaging device carried by a movable object is provided. The method comprises: detecting, using one or more sensors, motion information for the movable object; determining, based on the motion information and with aid of one or more processors, a change in a spatial relationship between the movable object and the target object; and modifying, with aid of the one or more processors, one or more parameters of the imaging device based on the determined change in the spatial relationship between the movable object and the target object such that the imaging device is focused on the target object.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types. In some embodiments, the method further comprises processing sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial disposition comprises a position of the movable object with respect to three degrees of freedom and an orientation of the movable object with respect to three degrees of freedom.

In some embodiments, the spatial disposition comprises one or more of: a longitude, a latitude, an altitude, a roll angle, a pitch angle, or a yaw angle of the movable object.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, the method further comprises receiving an initial value for each of the one or more parameters. In some embodiments, the initial value is input by a user. In some embodiments, the initial value is input by the user via a remote terminal in communication with the movable object. In some embodiments, the one or more parameters comprise a focus, and the initial value of the focus is determined using an autofocusing method.

In some embodiments, the target object is stationary.

In some embodiments, the target object is moving. In some embodiments, the method further comprises receiving tracking information indicative of movement of the target object relative to the movable object, wherein the one or more parameters are modified based on the tracking information. In some embodiments, the tracking information is generated based on image data of the target object.

In some embodiments, the method further comprises generating image data of the target object using the imaging device with the one or more modified parameters.

In another aspect, an imaging device carried by a movable object for imaging a target object is provided. The imaging device comprises: one or more processors configured to: receive, from one or more sensors mounted on or in the movable object, motion information for the movable object; determine, based on the motion information, a change in a spatial relationship between the movable object and the target object; and modify one or more parameters of the imaging device based on the determined change in the spatial relationship between the movable object and the target object such that the imaging device is focused on the target object.

In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial disposition comprises a position of the movable object with respect to three degrees of freedom and an orientation of the movable object with respect to three degrees of freedom.

In some embodiments, the spatial disposition comprises one or more of: a longitude, a latitude, an altitude, a roll angle, a pitch angle, or a yaw angle of the movable object.

In some embodiments, the imaging device further comprises an optical assembly and an image sensor, wherein the one or more parameters comprise a distance between an optical center of an optical assembly of the imaging device and an image sensor of the imaging device.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the one or more processors are further configured to receive an initial value for each of the one or more parameters. In some embodiments, the initial value is input by a user. In some embodiments, the initial value is input by the user via a remote terminal in communication with the movable object. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the one or more parameters are modified based on the tracking information. In some embodiments, the tracking information is generated based on image data of the target object.

In some embodiments, the one or more processors are further configured to generate image data of the target object according to the one or more modified parameters.

In another aspect, an imaging device for imaging a target object is provided. The imaging device comprises: one or more sensors configured to detect motion information for the imaging device; and one or more processors configured to: receive, from the one or more sensors, the motion information for the imaging device; determine, based on the motion information, a change in a spatial relationship between the imaging device and the target object; and modify one or more parameters of the imaging device based on the determined change in the spatial relationship between the imaging device and the target object such that the imaging device is focused on the target object.

In some embodiments, the imaging device is carried by a movable object. In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, wherein the one or more processors are further configured to process sensor data received from each of the plurality of different sensor types using a sensor fusion algorithm so as to determine the motion information.

In some embodiments, the motion information comprises one or more of: a translational velocity, a translational acceleration, an angular velocity, an angular acceleration, a position at a current time point, an orientation at a current time point, a position at a previous time point, or an orientation at a previous time point.

In some embodiments, the spatial disposition comprises a position of the imaging device with respect to three degrees of freedom and an orientation of the imaging device with respect to three degrees of freedom.

In some embodiments, the spatial disposition comprises one or more of: a longitude, a latitude, an altitude, a roll angle, a pitch angle, or a yaw angle of the movable object.

In some embodiments, the imaging device further comprises an optical assembly and an image sensor, wherein the one or more parameters comprise a distance between an optical center of the optical assembly and the image sensor.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the one or more processors are further configured to receive an initial value for each of the one or more parameters. In some embodiments, the initial value is input by a user. In some embodiments, the initial value is input by the user via a remote terminal in communication with the imaging device. In some embodiments, the one or more parameters comprise a focus, and the initial value of the focus is determined using an autofocusing method.

In some embodiments, the target object is stationary.

In some embodiments, the target object is moving. In some embodiments, the one or more processors are further configured to receive tracking information indicative of movement of the target object relative to the movable object, wherein the one or more parameters are modified based on the tracking information. In some embodiments, the tracking information is generated based on image data of the target object.

In some embodiments, the one or more processors are further configured to generate image data of the target object according to the one or more modified parameters.

In another aspect, a system for imaging a target object using an imaging device carried by a movable object is provided. The system comprises: one or more sensors configured to detect movement of the movable object; and one or more processors configured to: set one or more parameters of the imaging device such that the imaging device is focused on the target object when the movable object is in a first spatial disposition; detect, using the one or more sensors, a movement of the movable object from the first spatial disposition to a second spatial disposition; and modify the one or more parameters of the imaging device in response to the detected movement such that the imaging device is focused on the target object when the movable object is in the second spatial disposition.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to detect the movement.

In some embodiments, the second spatial disposition differs from the first spatial disposition with respect to one or more of position or orientation.

In some embodiments, the second spatial disposition differs from the first spatial disposition with respect to one or more of: longitude, latitude, altitude, roll angle, pitch angle, or yaw angle.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, the modify step comprises determining a modification to the one or more parameters based on the detected movement. In some embodiments, the modification is determined without imaging the target object. In some embodiments, the modification is determined without varying the focus of the imaging device. In some embodiments, the modification is determined without using input from a user.

In some embodiments, the set step comprises receiving an initial value for each of the one or more parameters. In some embodiments, the initial value is input by a user. In some embodiments, the initial value is input by the user via a remote terminal in communication with the movable object.

In some embodiments, the set step comprises using an autofocusing method to focus the imaging device on the target object.

In some embodiments, the target object is stationary.

In some embodiments, the target object is moving. In some embodiments, the one or more processors are further configured to receive tracking information indicative of movement of the target object relative to the movable object, wherein the change in spatial relationship is determined based on the tracking information. In some embodiments, the tracking information is generated based on image data of the target object.

In some embodiments, the one or more processors are further configured to generate image data of the target object using the imaging device with the one or more modified parameters.

In another aspect, a method for imaging a target object using an imaging device carried by a movable object, the method comprising: setting, with aid of one or more processors, one or more parameters of the imaging device such that the imaging device is focused on the target object when the movable object is in a first spatial disposition; detecting, using one or more sensors, a movement of the movable object from the first spatial disposition to a second spatial disposition; and modifying, with aid of the one or more processors, the one or more parameters of the imaging device in response to the detected movement such that the imaging device is focused on the target object when the movable object is in the second spatial disposition.

In some embodiments, the movable object is an unmanned aerial vehicle.

In some embodiments, the imaging device comprises a fixed focal length.

In some embodiments, the imaging device comprises a variable focal length.

In some embodiments, the imaging device comprises an image sensor.

In some embodiments, the one or more sensors are carried by the movable object.

In some embodiments, the one or more sensors comprise one or more of: an inertial sensor, a GPS sensor, or a vision camera.

In some embodiments, the one or more sensors comprise a plurality of different sensor types. In some embodiments, the method further comprises processing sensor data received from each of the plurality of different sensor types using a sensor fusion algorithm so as to detect the movement.

In some embodiments, the second spatial disposition differs from the first spatial disposition with respect to one or more of position or orientation.

In some embodiments, the second spatial disposition differs from the first spatial disposition with respect to one or more of: longitude, latitude, altitude, roll angle, pitch angle, or yaw angle.

In some embodiments, the one or more parameters comprise a distance between an optical center of an optical assembly of the imaging device and an image sensor of the imaging device.

In some embodiments, the one or more parameters comprise a focal length of the imaging device.

In some embodiments, the one or more parameters are modified so as to maintain a field of view of the imaging device.

In some embodiments, the modifying the one or more parameters comprises determining a modification to the one or more parameters based on the detected movement. In some embodiments, the modification is determined without imaging the target object. In some embodiments, the modification is determined without varying the focus of the imaging device. In some embodiments, the modification is determined without using input from a user.

In some embodiments, setting the one or more parameters comprises receiving an initial value for each of the one or more parameters. In some embodiments, the initial value is input by a user. In some embodiments, the initial value is input by the user via a remote terminal in communication with the movable object.

In some embodiments, setting the one or more parameters comprises using an autofocusing method to focus the imaging device on the target object.

In some embodiments, the target object is stationary.

In some embodiments, the target object is moving. In some embodiments, the method further comprises receiving tracking information indicative of movement of the target object relative to the movable object, wherein the change in spatial relationship is determined based on the tracking information. In some embodiments, the tracking information is generated based on image data of the target object.

In some embodiments, the method further comprises generating image data of the target object using the imaging device with the one or more modified parameters.

In another aspect, an imaging device carried by a movable object for imaging a target object is provided. The imaging device comprises: one or more processors configured to: set one or more parameters of the imaging device such that the imaging device is focused on the target object when the movable object is in a first spatial disposition; detect, using one or more sensors, a movement of the movable object from the first spatial disposition to a second spatial disposition; and modify the one or more parameters of the imaging device in response to the detected movement such that the imaging device is focused on the target object when the movable object is in the second spatial disposition.

In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to detect the movement.

In some embodiments, the second spatial disposition differs from the first spatial disposition with respect to one or more of position or orientation.

In some embodiments, the second spatial disposition differs from the first spatial disposition with respect to one or more of: longitude, latitude, altitude, roll angle, pitch angle, or yaw angle.

In some embodiments, the imaging device further comprises an optical assembly and an image sensor, wherein the one or more parameters comprise a distance between an optical center of the optical assembly and the image sensor.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the modify step comprises determining a modification to the one or more parameters based on the detected movement. In some embodiments, the modification is determined without imaging the target object. In some embodiments, the modification is determined without varying the focus of the imaging device. In some embodiments, the modification is determined without using input from a user.

In some embodiments, the set step comprises receiving an initial value for each of the one or more parameters. In some embodiments, the initial value is input by a user. In some embodiments, the initial value is input by the user via a remote terminal in communication with the movable object.

In some embodiments, the set step comprises using an autofocusing method to focus the imaging device on the target object.

In some embodiments, the target object is stationary.

In some embodiments, the target object is moving.

In some embodiments, the one or more processors are further configured to receive tracking information indicative of movement of the target object relative to the movable object, wherein the one or more parameters are modified based on the tracking information. In some embodiments, the tracking information is generated based on image data of the target object.

In some embodiments, the one or more processors are further configured to generate image data of the target object according to the one or more modified parameters.

In another aspect, an imaging device for imaging a target object is provided. The imaging device comprises: one or more sensors configured to detect motion information for the imaging device; and one or more processors configured to: set one or more parameters of the imaging device such that the imaging device is focused on the target object when the imaging device is in a first spatial disposition; detect, using one or more sensors, a movement of the imaging device from the first spatial disposition to a second spatial disposition; and modify the one or more parameters of the imaging device in response to the detected movement such that the imaging device is focused on the target object when the imaging device is in the second spatial disposition.

In some embodiments, the imaging device is carried by a movable object. In some embodiments, the movable object is an unmanned aerial vehicle.

In some embodiments, the imaging device further comprises an optical assembly configured to focus light from the target object. In some embodiments, the optical assembly comprises a fixed focal length. In some embodiments, the optical assembly comprises a variable focal length.

In some embodiments, the imaging device further comprises an image sensor configured to generate image data of the target object.

In some embodiments, the one or more sensors comprise one or more of: an inertial sensor, a GPS sensor, or a vision camera.

In some embodiments, the one or more sensors comprise a plurality of different sensor types. In some embodiments, the one or more processors are further configured to process sensor data received from each of the plurality of different sensor types using a sensor fusion algorithm so as to detect the movement.

In some embodiments, the second spatial disposition differs from the first spatial disposition with respect to one or more of position or orientation.

In some embodiments, the second spatial disposition differs from the first spatial disposition with respect to one or more of: longitude, latitude, altitude, roll angle, pitch angle, or yaw angle.

In some embodiments, the imaging device further comprises an optical assembly and an image sensor, wherein the one or more parameters comprise a distance between an optical center of the optical assembly and the image sensor.

In some embodiments, the imaging device further comprises an optical assembly configured to focus light from the target object, wherein the one or more parameters comprise a focal length of the optical assembly.

In some embodiments, the imaging device further comprises an optical assembly having a field of view, wherein the one or more parameters are modified so as to maintain the field of view of the optical assembly.

In some embodiments, the modify step comprises determining a modification to the one or more parameters based on the detected movement. In some embodiments, the modification is determined without imaging the target object. In some embodiments, the modification is determined without varying the focus of the imaging device. In some embodiments, the modification is determined without using input from a user.

In some embodiments, the set step comprises receiving an initial value for each of the one or more parameters. In some embodiments, the initial value is input by a user. In some embodiments, the initial value is input by the user via a remote terminal in communication with the movable object.

In some embodiments, the set step comprises using an autofocusing method to focus the imaging device on the target object.

In some embodiments, the target object is stationary.

In some embodiments, the target object is moving. In some embodiments, the one or more processors are further configured to receive tracking information indicative of movement of the target object relative to the imaging device, wherein the one or more parameters are modified based on the tracking information. In some embodiments, the tracking information is generated based on image data of the target object.

In some embodiments, the one or more processors are further configured to generate image data of the target object according to the one or more modified parameters.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
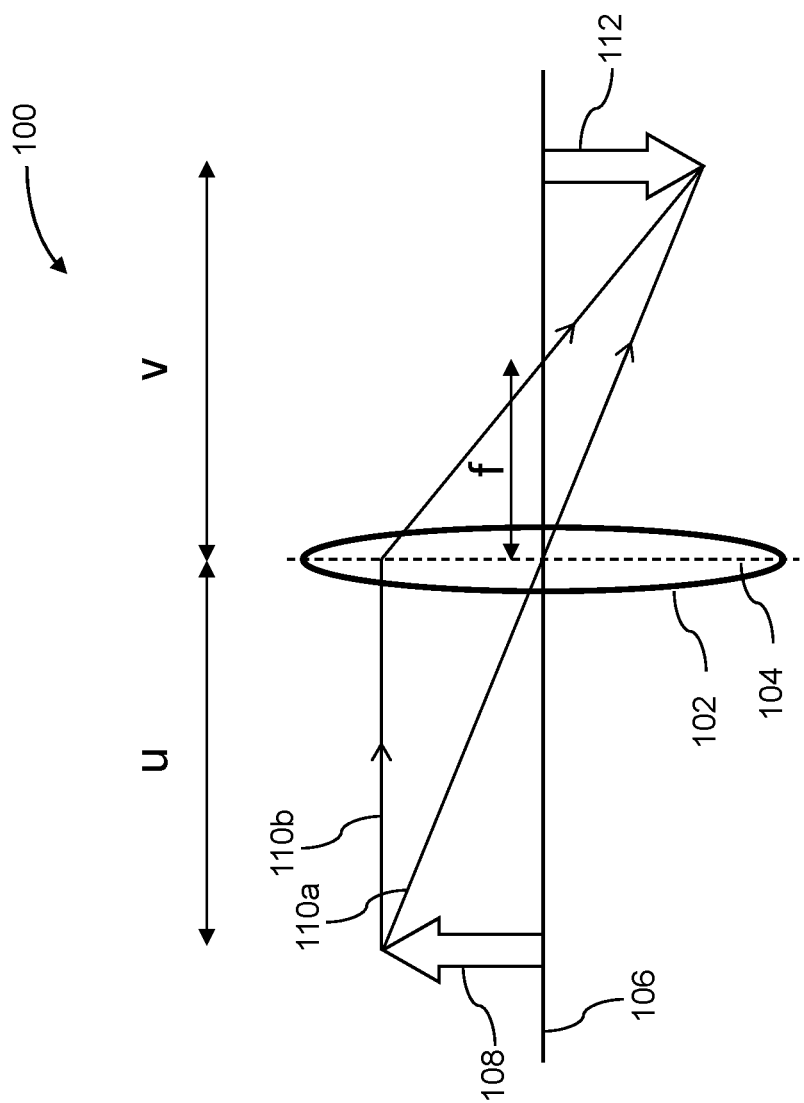
FIG. 1 illustrates a simplified model of an optical assembly, in accordance with embodiments.

The systems, methods, and devices of the present disclosure can be used to improve the operation of imaging devices carried by movable objects such as unmanned aerial vehicles (UAVs). In some embodiments, the systems, methods, and devices provided herein utilize sensor data indicative of motion of the movable object to determine modifications to one or more parameters of the imaging device in order to focus the imaging device on a target object. The embodiments of the present disclosure allow for the imaging device to be dynamically and automatically focused such that clear images of a target object can be produced even when the movable object is in motion. The systems, methods, and devices described herein can be used to improve the quality and accuracy of image data obtained using imaging devices carried by UAVs and other types of movable objects.

For example, in some embodiments, a camera mounted on a UAV is used to capture photographs and/or video of a target object on the ground. The camera is initially focused on the target object while the UAV is substantially stationary (e.g., on the ground or hovering in place). The UAV is then flown in the air (e.g., following a predetermined flight path or manually controlled by a user), such that the spatial relationship between the camera and target object is changing. The UAV can include an inertial sensor and a GPS sensor that provide data indicative of the motion of the UAV, and this motion information can be used to update the focusing of the camera so that the camera remains focused on the target object throughout the UAV's flight.

The systems, methods, and devices of the present disclosure can be used to image various types of target objects. A target object can include any natural or man-made objects or structures such geographical features (e.g., mountains, vegetation, valleys, lakes, rivers, etc.), buildings (e.g., residential buildings, commercial buildings, industrial buildings, government buildings, etc.), vehicles (e.g., aircraft, ships, cars, trucks, buses, vans, motorcycles, etc.). A target object can also include live subjects such as people or animals. A target object can be located on the ground, in the air, in space, on water, under water, underground, in an indoor environment, and/or in an outdoor environment. In some embodiments, a target object can encompass a plurality of objects, a single object, or a portion of an object (e.g., a surface of an object). A target object can include one or more points, one or more areas, one or more volumes, or combinations thereof. The target object may be moving or stationary relative to the imaging device. In some embodiments, the target object is selected by a user, e.g., via a user interface of a remote terminal or other controller in communication with the imaging device. Alternatively, the target object can be selected automatically, e.g., by one or more processors implementing a machine vision-based algorithm to identify and/or track the target object.

The target object can be imaged by an imaging device. Various types of imaging devices can be used with the embodiments presented herein, including cameras, scanners, and the like. An imaging device can be configured to detect electromagnetic radiation (e.g., visible, infrared, and/or ultraviolet light) and generate image data based on the detected electromagnetic radiation. For example, an imaging device may include an image sensor that generates electrical signals in response to wavelengths of light, such as a charge-coupled device (CCD) sensor, a complementary metal-oxide-semiconductor (CMOS) sensor, and the like. In some embodiments, the image sensor includes an array of individual sensor elements each configured to generate a respective electrical signal in response to detected light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

In some embodiments, an imaging device includes an optical assembly configured to receive and focus light from a target object onto the image sensor. The optical assembly can include one or more optical components, such as one or more lenses (e.g., convex and/or concave lenses), shutters, apertures, mirrors, and the like. The optical components of an optical assembly may all be aligned along the same optical axis. Alternatively, some or all of the optical components of an optical assembly may not be aligned along the same optical axis. In some embodiments, an optical assembly includes a plurality of lenses, and each of the lenses can have different optical characteristics (e.g., different focal lengths), or some or all of the lenses can have the same optical characteristics (e.g., same focal lengths). The configuration of the optical components can determine the optical characteristics of the optical assembly, which in turn determines the optical characteristics of the overall imaging device, such as the focal length (e.g., maximum focal length, minimum focal length), aperture size (e.g., maximum aperture size), and focusing range (e.g., minimum focus distance). In some embodiments, one or more optical characteristics of the optical assembly can be variable, such as a variable focal length (e.g., zoom lens). In some embodiments, one or more optical characteristics of the optical assembly can be fixed, such as have a fixed focal length (e.g., prime lens).

In some embodiments, the optical assembly is provided as a separate component that is removably coupled to the imaging device. For example, the imaging device can include a camera body containing the image sensor, and the optical assembly can be a camera lens assembly that is coupled to the camera body via a lens mount or other coupling interface. In such embodiments, different optical assemblies can be interchangeably used with the imaging device in order to vary the optical characteristics of the imaging device. Alternatively, the optical assembly can be permanently affixed to or integrally formed as a single unified piece with the imaging device (e.g., a camera with a built-in zoom or prime lens), such that the optical assembly cannot be removed without damaging or destroying the device.

FIG. 1 illustrates a simplified model of an optical assembly 100, in accordance with embodiments. The optical assembly 100 includes a single lens 102 having a principal axis 104 and an optical axis 106. A target object 108 to be imaged by the optical assembly is located a distance u away from the lens 102 along the optical axis 106, also referred to herein as the "object distance." Exemplary light rays 110a, 110b originating from the object 108 are focused by the lens 102 to form an image 112 on the opposite side of the lens 102. The image 112 is located a distance v away from the lens 102 along the optical axis 106, also referred to herein as the "image distance." The points on the object 108 correspond to the points on the image 112 in a one-to-one relation. If the object distance u is varied, the image distance v varies accordingly. The image point corresponding to an object at infinity is referred to as the "focal point" or "focus," and the distance f between the focal point and lens 102 along the optical axis 106 is referred to as the "focal length." The object distance u, image distance v, and focal length f satisfy the following equation:

$$\frac{1}{f} = \frac{1}{u} + \frac{1}{v}$$

Although the depicted embodiment illustrates an optical assembly 100 with a single lens, one of ordinary skill in the art would appreciate that the principles described herein can also be applied to more complex optical assemblies with a plurality of lenses. For example, an optical assembly can include a plurality of lenses that can be considered to act as a single lens, and the object distance u, image distance v, and focal length f of such an assembly can be defined relative to the effective optical center of the plurality of lenses. In some embodiments, the optical center for a single lens is the geometric center of the lens, while the optical center for a plurality of lenses is the theoretical location that all light rays entering the optical assembly will pass through.

In some embodiments, the imaging device is considered to be focused on a target object located at an object distance u when the corresponding image distance v coincides with the location of the image sensor. Optionally, the imaging device can be considered to be focused on a target object when the image distance is sufficiently close to the image sensor location such that the resultant image of the target object appears focused to the human eye. For example, the size of the circle of confusion for each image point of the target object may be less than or equal to the circle of confusion diameter limit (the largest blur spot that will be perceived by the human eye as a point). Referring again to the embodiment of FIG. 1, the image sensor may be located at or near the location of the image 112 along the optical axis 106 in order to produce a focused imaged of the target object 108. Portions of an image that are in focus may be clearer and sharper than portions of an image that are out of focus. A portion of an image may be considered to be in focus if it appears focused to the human eye, and a portion of an image may be considered to be out of focus if it appears unfocused to the human eye.

The imaging device can be focused on objects at different distances by adjusting the configuration of the optical assembly. Various mechanisms can be used to adjust the optical configuration in order to focus the imaging device on a specified target. For example, the focus of the imaging device can be shifted (e.g., closer to or further from the imaging device) by varying the distance between the effective optical center of the optical assembly and the image sensor of an imaging device (e.g., forward or backwards along the optical axis). In some embodiments, the optical assembly includes one or more lenses that serve as focusing optics, and the distance between the optical center and the image sensor can be changed by moving some or all of the lenses of the focusing optics along the optical axis (e.g., using a motor, piezoelectric element, or other suitable actuator). Alternatively, the focusing optics can include one or more variable focus lenses which allow the distance to be varied without movement along the optical axis. The focusing optics may be internal focusing optics, such that the focusing procedure does not change the positioning of the outermost lenses of the optical assembly.

Focusing of the imaging device on a target object can be performed in various ways. In some embodiments, an autofocusing method is used. An autofocusing method may utilize one or more processors to determine a focus for the imaging device, without using input from a user. The autofocusing method may be an active autofocusing method utilizing a separate sensor (e.g., an ultrasonic sensor, an infrared sensor) to measure the distance from the imaging device to the target object in order to determine the correct focus. Alternatively, the autofocusing method may be a passive autofocusing method which uses image data of the target object obtained by the imaging device to determine the correct focus. For instance, contrast detection autofocusing varies the focus over a range of distances, and selects the optical configuration that produces the largest contrast value in the image data. As another example, phase detection autofocusing splits incoming light into two beams that are directed onto two separate sensors and uses the phase difference between the signals produced by each sensor to determine the correct optical configuration. In some embodiments, hybrid autofocusing methods can be used, which combine two or more autofocusing methods (e.g., active and passive methods, phase detection and contrast detection methods).

The focusing procedures described herein may or may not also involve altering the focal length of the optical assembly ("zooming"). Focusing may be performed independently of zooming, and vice-versa. In some embodiments, an optical assembly may include both focusing optics, used to vary the focus of the imaging device, and zoom optics, used to vary the focal length of the imaging device. Alternatively, an optical assembly may include focusing optics only or zoom optics only.

In some embodiments, an imaging device for imaging a target object is carried by a movable object. The imaging devices of the present disclosure can be carried by various types of movable objects, such as by one or more of the movable objects described further herein. An imaging device can be situated on any suitable portion of the movable object, such as above, underneath, on the side(s) of, or within the movable object. Some imaging devices can be mechanically coupled to the movable object such that the spatial disposition and/or motion of the movable object corresponds to the spatial disposition and/or motion of the imaging devices. The imaging device can be coupled to the movable object via a rigid coupling, such that the imaging device does not move relative to the portion of the movable object to which it is attached. Alternatively, the coupling between the imaging device and the movable object can permit movement of the imaging device relative to the movable object. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the movable object. Furthermore, the imaging device can be electrically coupled with a portion of the movable object (e.g., processing unit, control system, data storage) so as to enable the data collected by the imaging device to be used for various functions of the movable object (e.g., navigation, control, propulsion, communication with a user or other device, etc.).

Optionally, an imaging device can be mounted to a movable object via a carrier that permits motion of the imaging device relative to the movable object. The carrier can be a gimbal assembly that permits rotation of the imaging device relative to the movable object along a roll axis, pitch axis, and/or yaw axis. Additionally, the carrier can include electrical interfaces that permit transmission of power and control signals from the movable object to the imaging device, and transmission of image data from the imaging device to the movable object. In some embodiments, control signals are transmitted from the movable object to the imaging device via the carrier in order to control one or more parameters of the imaging device. Additional description of exemplary carriers suitable for use with the embodiments of the present disclosure are discussed further herein.

In some embodiments, the movable object used to carry the imaging device is a UAV. For example, the UAV may be a small-scale UAV (e.g., weighing no more than 10 kg, having a maximum dimension of no more than 1.5 m). The UAV can be a rotorcraft, such as a multi-rotor aircraft that is propelled to move through the air by a plurality of propellers (e.g., a quadcopter). The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.).

Although some embodiments herein are presented in the context of UAVs, it shall be appreciated that the systems, methods, and devices of the present disclosure can be adapted for use with other types of movable objects, such as ground vehicles. Additional examples of movable objects suitable for use with the systems, methods, and devices provided herein are described in further detail below.

The systems, methods, and devices of the present disclosure can be used to determine one or more parameters for operating an imaging device carried by a movable object. Examples of such parameters include but are not limited to: focus, focal length, zoom level, aperture size, exposure time, shutter speed, lens speed, imaging mode, white balance, ISO, or flash. The parameters of the imaging device may be adjusted in order to modify one or more characteristics of the resulting image data, such as point(s) of focus, field of view, depth of field, contrast, brightness, resolution, sharpness, noise level, or combinations thereof. For example, one or more parameters of the imaging device can be determined in order to focus the imaging device on the target object. Alternatively or in combination, one or more parameters can be adjusted in order to generate image data with a desired field of view or zoom level. Adjustments to the parameters of an imaging device may be performed manually, automatically, or semi-automatically. For example, the focus of an imaging device may be set manually (e.g., a user adjusting a focus ring of a lens assembly), automatically (e.g., a processor implementing an autofocusing method such as contrast detection autofocusing, phase detection autofocusing, or hybrid autofocusing), or semi-automatically (e.g., a user selecting a target, and the processor automatically determining a suitable focus for the selected target). Some parameters may be limited to a certain range of values, e.g., based on the particular configuration of the imaging device. For example, an imaging device with a prime lens may be a limited to a single focal length, while the focal length of an imaging device with a zoom lens may be variable within a range defined by the minimum and maximum focal lengths of the zoom lens. As another example, the focus of an imaging device may be constrained by the minimum focus distance of the particular lens assembly used.

In some embodiments, the parameters of the imaging device are determined while the movable object is substantially stationary (e.g., resting on a surface, hovering in place). In certain situations, however, it may be desirable or necessary to produce images of a target object while the movable object is in motion (e.g., flying in the air). A movable object may move in a translational direction, a rotational direction, or a combination thereof. The movement amount, direction, velocity, and/or acceleration can be measured in absolute terms (e.g., relative to a global reference frame) as well as in relative terms (e.g., relative to a local reference frame such as the reference frame of a target object). The motion of the movable object may be manually controlled by a user (e.g., via user commands transmitted to the movable object via a remote terminal), automatically (e.g., by a processor onboard the movable object), or semi-automatically. For example, the movable object may be programmed to automatically navigate along a predetermined trajectory, in a target direction, and/or towards a target location. As another example, the user may control the movement of the movable object with respect to up to three degrees of freedom in position and/or orientation. In some embodiments, certain aspects of the motion may be controlled automatically while other aspects may be controlled manually. For instance, a user may control the movement direction of a UAV, while the movement velocity is automatically controlled.

Figure 2:
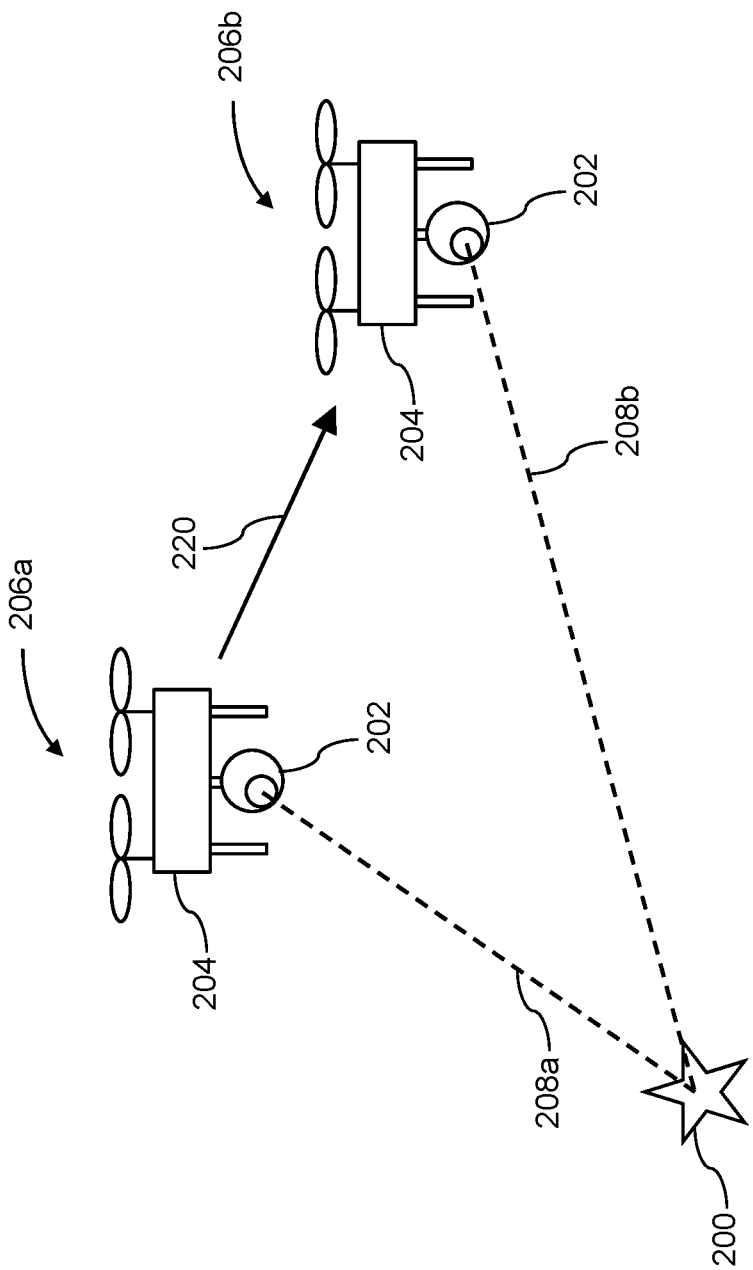
FIG. 2 schematically illustrates imaging of a target object with an imaging device carried by a movable object, in accordance with embodiments.

FIG. 2 schematically illustrates imaging of a target object 200 with an imaging device 202 carried by a movable object 204, in accordance with embodiments. The movable object 204 and imaging device 202 are initially in a first spatial disposition 206a. The spatial disposition can be defined with respect to three degrees of freedom in position (e.g., longitude, latitude, altitude) and three degrees of freedom in orientation (e.g., roll angle, pitch angle, yaw angle). When in the first spatial disposition 206a, the movable object 204 and imaging device 202 are in a first spatial relationship with the target object 200. For example, in the depicted embodiment, the movable object 204 and imaging device 202 are a first distance 208a away from the target object 200.

The movable object 204 may move while the target object 200 is being imaged by the imaging device 202 along a movement trajectory 210 with a certain velocity and acceleration. The movement trajectory 120 may be characterized by a direction and distance of movement. Movement of the movable object 204 along the movement trajectory may result in the movable object 204 may being in a second spatial disposition 206b. When in the second spatial disposition 206b, the movable object 204 and imaging device 202 are in a second spatial relationship with the target object 200. For example, in the depicted embodiment, the movable object 204 and imaging device 202 are a second distance 208b away from the target object 200. The second spatial disposition 206b may differ from the first spatial disposition 206a (e.g., with respect to up to three degrees of freedom in position and/or up to three degrees of freedom in orientation), such that the spatial relationship of the movable object 204 and imaging device 202 with the target object 200 changes. However, the movement of the movable object 204 and the imaging device 202 may not necessarily result in a change in the spatial relationship with the target object 200 if the target object 200 itself is also mobile. For instance, if the target object 200 moves along a movement trajectory similar to that of the movable object 204 and imaging device 202, there may be little or no change in the spatial relationship. Conversely, the spatial relationship may change if the target object 200 moves, even if the movable object 204 and imaging device 202 remain stationary.

Changes in the spatial relationship between the target object and the imaging device may result in undesirable changes to the resultant image data if no adjustments to the imaging parameters are made. For example, the target object may become less focused or out of focus, a non-target object may become more focused or in focus, the field of view may increase or decrease, the contrast may increase or decrease, the brightness may increase or decrease, the sharpness may increase or decrease, the resolution may decrease, or the noise level may increase, to name a few. In some embodiments, imaging parameters that are determined and/or optimized for a certain spatial relationship between the imaging device and target object may not be suitable and/or optimal for operating the imaging device for different spatial relationships.

The present disclosure provides improved systems, methods, and devices for determining one or more parameters of the imaging device during and/or after a movement of the movable object. In some embodiments, one or more parameters of the imaging device are modified in response to a change in the spatial disposition of the movable object (or imaging device) and/or a change in the spatial relationship between the movable object (or imaging device) and the target object that occurs as a result of the movement of the movable object, imaging device, and/or target object. Such modifications can be performed in order to compensate for changes in one or more image characteristics that would otherwise occur due to the changed spatial disposition and/or spatial relationship. For instance, one or more parameters can be modified such that the imaging device remains focused on the target object even though the object distance has changed. Alternatively or in combination, one or more parameters can be modified so as to maintain a certain field of view or zoom level even when the movable object moves closer to or farther away from the target object. The embodiments describe herein provide dynamic and continuous adjustments to imaging parameters in order to maintain high quality imaging even while the movable object and imaging device are in motion.

Figure 3:
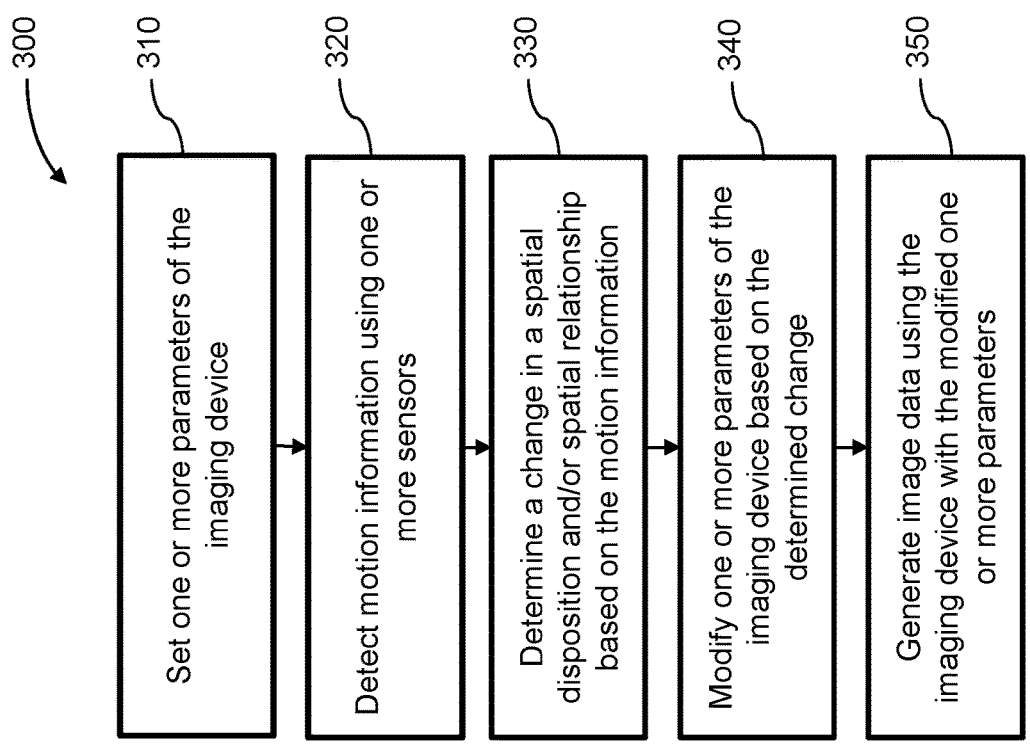
FIG. 3 illustrates a method for imaging a target object using an imaging device carried by a movable object in accordance with embodiments.

FIG. 3 illustrates a method 300 for imaging a target object using an imaging device carried by a movable object, in accordance with embodiments. The method 300 can be performed using any embodiment of the systems and devices described herein. In some embodiments, some or all of the steps of the method 300 are performed with the aid of one or more processors (e.g., carried onboard the movable object and/or the imaging device).

In step 310, one or more parameters of the imaging device are set. The parameters can include one or more of: focus, focal length, zoom level, aperture size, exposure time, shutter speed, lens speed, imaging mode, white balance, ISO, or flash. In some embodiments, step 310 involves receiving an initial value for each of the one or more parameters, and setting each of the parameters to the respective initial value. The initial value can be input by a user, e.g., via a remote terminal in communication with the movable object and/or imaging device. Alternatively, the initial value can be determined automatically.

For example, in some embodiments, the one or more parameters are set in order to focus the imaging device on the target object. In such embodiments, step 310 can involve focusing the imaging device onto the target object, e.g., by adjusting the distance between an optical center of an optical assembly of the imaging device and an image sensor of the imaging device. The focus of the imaging device can be set in a variety of ways. For instance, a user can manually identify the target object for focusing. In some embodiments, the user selection of the target object is achieved by a user selecting an area of the at least one of the one or more images being displayed on a display, the selected area corresponding to the target object. For example, the user may select the target object by directly touching a touchscreen using a finger or stylus. As another example, the user may select the target object using a mouse, joystick, gesture, or voice command. In yet another embodiment, the user may select the target object via a wearable device such as a helmet, virtual reality goggle, and the like. Selection of the target object can involve any suitable motion including touching or tapping, swiping, circling, clicking, or the like associated with any suitable input methods such as described herein. The imaging device can then be focused on the selected target object. For example, an autofocusing method can be used to set the initial focus value, such as an active autofocusing method, a passive autofocusing method, a contrast detection autofocusing method, a phase detection autofocusing method, or a hybrid autofocusing method. Alternatively or in combination, the user can manually set and/or adjust the focus value, e.g., via the remote terminal.

Alternatively or in combination, in some embodiments, the one or more parameters are set such that the imaging device has a certain field of view or zoom level. This can be performed, for example, to ensure that the target object has a certain size (e.g., length, height, and/or width) within the image data. In some embodiments, the focal length of the imaging device is set to an initial value that corresponds to the desired field of view or zoom level. The initial focal length can be manually set by a user or determined automatically.

In some embodiments of the method 300, step 310 is omitted, such that the method 300 can be performed without setting initial values for the parameter(s).

In step 320, motion information for the movable object and/or imaging device is detected. The motion information can include any data indicative of a change in the spatial disposition of the movable object and/or imaging device. Alternatively or in combination, the motion information can include any data indicative of a change in the spatial relationship between the movable object and a target object, and/or the imaging device and a target object. For example, the motion information can include one or more of: a translational velocity, a translational acceleration, an angular velocity, an angular acceleration, a position at a current time point, an orientation at a current time point, a position at a previous time point, or an orientation at a previous time point.

In some embodiments, the motion information for the movable object and/or imaging device is detected using one or more sensors. Exemplary sensors suitable for use with the embodiments disclosed herein include but are not limited to: location sensors (e.g., global positioning system (GPS) sensors, mobile device transmitters enabling location triangulation), image or vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors (e.g., altimeter), attitude sensors (e.g., compasses), pressure sensors (e.g., barometers), audio sensors (e.g., microphones), and field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; the projection view of a specific surrounding environment provided by an image sensor; relative distance information provided by an ultrasonic sensor, lidar, or time-of-flight camera). In some instances, the local coordinate system may be a body coordinate system that is defined relative to the movable object.

For example, GPS sensors and other location sensors can be used to provide data indicative of the position of the movable object and/or imaging device, and the motion information can be determined by comparing the positions at different time points. Altitude sensors and/or pressure sensors can be used to provide data indicative of the altitude of the movable object and/or imaging device, and the motion information can be determined by comparing the altitudes at different time points. Attitude sensors can be used to provide data of indicative of the orientation of the movable object and/or imaging device, and the motion information can be determined by comparing the orientation at different time points. Inertial sensors can be used to provide data indicative of the velocity (e.g., angular velocity) and acceleration (e.g., translational acceleration) of the movable object and/or imaging device. Image sensors can be used to provide data indicative of the position, velocity, and acceleration of the movable object and/or imaging device.

In some embodiments, the motion information is generated by combining sensor data obtained by multiple sensors, also known as "sensor fusion." For instance, sensor fusion can be used to combine sensing data obtained by different sensor types, such as GPS sensors, inertial sensors, and/or image sensors. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Fusion of sensor data from multiple sensors can be performed using various types of sensor fusion algorithms, such as Kalman filter-based algorithms or optimization algorithms. Sensor fusion can be used to compensate for limitations or inaccuracies associated with individual sensor types, thereby improving the accuracy and reliability of the final sensing result.

In some embodiments, a sensor fusion algorithm is used to process data from each of a plurality of different sensor types in order to determine the motion information. For instance, a sensor fusion algorithm can be used to combine position data from GPS sensors with velocity and/or acceleration information from inertial sensors. Optionally, the sensor fusion algorithm can also use position, velocity, and/or acceleration data from a camera or other vision sensor, which may or may not be the imaging device. In some embodiments, the output of the sensor fusion algorithm is an estimate of the position and/or orientation of the movable object and/or imaging device over a plurality of different time points.

Optionally, motion information for the movable object can be used to determine motion information for imaging device, or vice-versa. For example, the spatial relationship between the movable object and imaging device can be determined and used in combination with motion information for the movable object to determine the corresponding motion information for the imaging device. Conversely, the spatial relationship between the movable object and imaging device can be determined and used in combination with motion information for the imaging device to determine the corresponding motion information for the movable object. The spatial relationship between the movable object and imaging device can be determined based on sensor data, user input, or can be a predetermined value (e.g., if the movable object and imaging device are in a fixed spatial relationship).

The sensors can be configured in a variety of ways. In some embodiments, the sensor data is received from one or more sensors carried by the movable object, one or more sensors carried by the imaging device, or combinations thereof. For example, the sensors can be carried by the movable object only or by the imaging device only. Alternatively, one or more sensors can be carried by on the movable object and one or more other sensors can be carried by the imaging device. Optionally, one or more sensors can be carried by a coupling between the movable object and the imaging device, such as carried by a gimbal or other carrier.

A sensor can be situated on any suitable portion of the movable object, imaging device, or carrier, or a combination thereof, such as above, underneath, on the side(s) of, or within a body of the movable object, imaging device, or carrier. In some embodiments, one or more sensors can be enclosed within a housing of the movable object, imaging device, or carrier, positioned outside the housing, coupled to a surface (e.g., inner or outer surface) of the housing, or can form part of the housing. Some sensors can be mechanically coupled to the movable object, imaging device, or carrier such that the spatial disposition and/or motion of the movable object, imaging device, or carrier correspond to the spatial disposition and/or motion of the sensors. The sensor can be coupled to the movable object, imaging device, or carrier via a rigid coupling, such that the sensor does not move relative to the portion of the movable object, imaging device, or carrier to which it is attached. Alternatively, the coupling between the sensor and the movable object, imaging device, or carrier can permit movement of the sensor relative to the movable object, imaging device, or carrier. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the movable object, imaging device, or carrier comprises shock absorbers or dampers that reduce vibrations or other undesirable mechanical movements from being transmitted from the movable object, imaging device, or carrier body to the sensor. Optionally, the sensor can be integrally formed with a portion of the movable object, imaging device, or carrier.

In step 330, a change in a spatial disposition and/or spatial relationship is determined based on the motion information from step 320. The spatial disposition can be a spatial disposition of the movable object, the imaging device, or both. For example, the spatial disposition can be a position of the movable object with respect to three degrees of freedom (e.g., longitude, latitude, altitude), an orientation of the movable object with respect to three degrees of freedom (e.g., roll angle, pitch angle, yaw angle), a position of the imaging device with respect to three degrees of freedom (e.g., longitude, latitude, altitude), and/or an orientation of the imaging device with respect to three degrees of freedom (e.g., roll angle, pitch angle, yaw angle). The change in spatial disposition can be a change in the longitude, latitude, altitude, roll angle, pitch angle, and/or yaw angle of the movable object. The change in spatial disposition can be a change in the longitude, latitude, altitude, roll angle, pitch angle, and/or yaw angle of the imaging device. In some embodiments, the change in spatial disposition is determined by comparing position and/or orientation data from a plurality of different time points.

The spatial relationship can be a spatial relationship between the movable object and the target object, a spatial relationship between the imaging device and the target object, or both. For example, the spatial relationship can be a distance between the movable object and the target object, an angle between the movable object and the target object, a distance between the imaging device and the target object, and/or an angle between the imaging device and the target object. The change in spatial relationship can be a change in the distance between the movable object and the target object, a change in the angle between the movable object and the target object, a change in the distance between the imaging device and the target object, and/or a change in the angle between the imaging device and the target object. In some embodiments, the change in spatial relationship is determined by comparing the distances and/or angles from a plurality of different time points.

In step 340, one or more parameters of the imaging device are modified based on the change in spatial disposition and/or spatial relationship determined in step 330. The parameters can include one or more of: focus, focal length, zoom level, aperture size, exposure time, shutter speed, lens speed, imaging mode, white balance, ISO, or flash. The modified parameters can be the same parameters that were initially set in step 310, or can be different parameters.

For example, in some embodiments, the one or more parameters are modified based on the determined change in spatial disposition and/or spatial relationship such that the imaging device is focused on the target object. Optionally, the imaging device may have been previously focused on the target object (e.g., in step 310), and step 340 can involve modifying the one or more parameters to maintain the focusing. In some embodiments, the determined change is used to modify the focus of the imaging device, such as by modifying the distance between the optical center of the optical assembly of the imaging device and the image sensor of the imaging device, in order to focus the imaging device on the target object. Step 340 can further involve determining the modification to the one or more parameters (e.g., focus) in order to focus the imaging device on the target object, based on the change in spatial disposition and/or spatial relationship. An exemplary method for performing such a determination is presented below.

As previously discussed, the imaging device can be considered to be focused on a target object located at an object distance u when the corresponding image distance v coincides with or is sufficiently near the location of the image sensor, e.g., so that image data of the target object appears focused to the human eye. For an imaging device with a fixed focal length f (e.g., a prime lens), if the object distance u varies by an amount Δu, the corresponding amount of variation Δv to the image distance v in order to maintain focusing can be determined as follows:

$$\frac{1}{f} = \frac{1}{u + \Delta u} + \frac{1}{v + \Delta v}$$

$$\Delta v = \frac{(u + \Delta u)f}{u + \Delta u - f} - v$$

From the initial focusing performed in step 310, the values of the initial image distance v and focal length f are known, and the initial object distance u can be determined accordingly. Δu, the change in object distance, can be calculated as described below.

Figure 4:
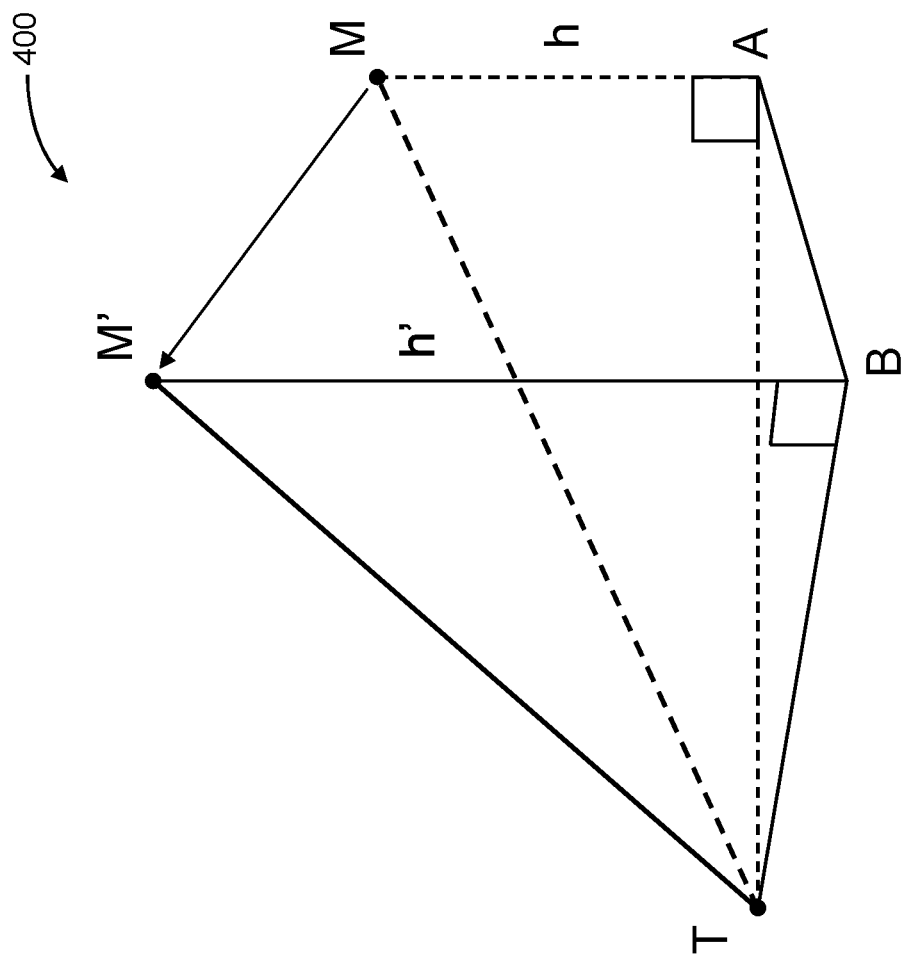
FIG. 4 illustrates a simplified model for calculating a change in the object distance, in accordance with embodiments.

FIG. 4 illustrates a simplified model 400 for calculating a change in the object distance, in accordance with embodiments. Although FIG. 4 is described herein with respect to a spatial relationship between a movable object and a target object, one of ordinary skill in the art would appreciate that the principles described with respect to the model 400 can also be used to describe a spatial relationship between an imaging device and a target object.

In the model 400, the target object is located at point T. The movable object is initially located at point M and then moves to a point M'. The projection of points M and M' onto the ground are points A and B, respectively. The location of points M and M' can be determined using position data (e.g., from a GPS sensor). The height h of point M from the ground and height h' of point M' from the ground can be determined using altitude data (e.g., from an altitude sensor, pressure sensor, etc.). Optionally, sensor fusion of data from multiple sensors (e.g., GPS sensor, inertial sensor, vision sensor, and/or altitude sensor) can be used to determine the spatial disposition of points M and M'.

The following equations can then be obtained using the Pythagorean theorem:

$$AT = \sqrt{MT^2 - MA^2}$$

$$BT = \sqrt{M'T^2 - M'B^2}$$

$$\Delta u = M'T - MT = \sqrt{BT^2 - h'^2} - u$$

The next step is to calculate the distance BT between the point B and the target object point T. This can be accomplished by determining the geometry of the triangle ABT, e.g., by determining the distance AB and the angle θ between lines TA and AB. These values are related to the change in spatial disposition of the movable object from point M to point M', and therefore can be obtained based on sensor data, as previously described with respect to steps 320 and 330. Subsequently, the values of Δu and Δv can be determined, and Δv can be used to determine adjustments to the imaging parameters (e.g., change in distance between the optical center of the optical assembly and image sensor) in order to focus the imaging device on the target object.

As another example, in some embodiments, the one or more parameters are modified based on the determined change in spatial disposition and/or spatial relationship in order to maintain a field of view of the imaging device. Optionally, the field of view of the imaging device may have been previously set (e.g., in step 310), and step 340 can involve modifying the one or more parameters to maintain the field of view. In some embodiments, the determined change is used to modify the focal length of the imaging device, e.g., by varying the configuration of the zoom optics of the optical assembly. Step 340 can further involve determining the modification to the one or more parameters (e.g., focal length) in order to maintain the field of view, based on the change in spatial disposition and/or spatial relationship. An exemplary method for performing such a determination is presented below.

For an imaging device with a variable focal length (e.g., a zoom lens), both the focal length f and image distance v can be varied in order to maintain the field of view and focusing on a the target object. The field of view can be kept substantially constant in order to maintain the size (e.g., height) of the target object in the image data. The change in focal length Δf and image distance Δv to maintain the field of view and focusing can be calculated as follows.

Figure 5:
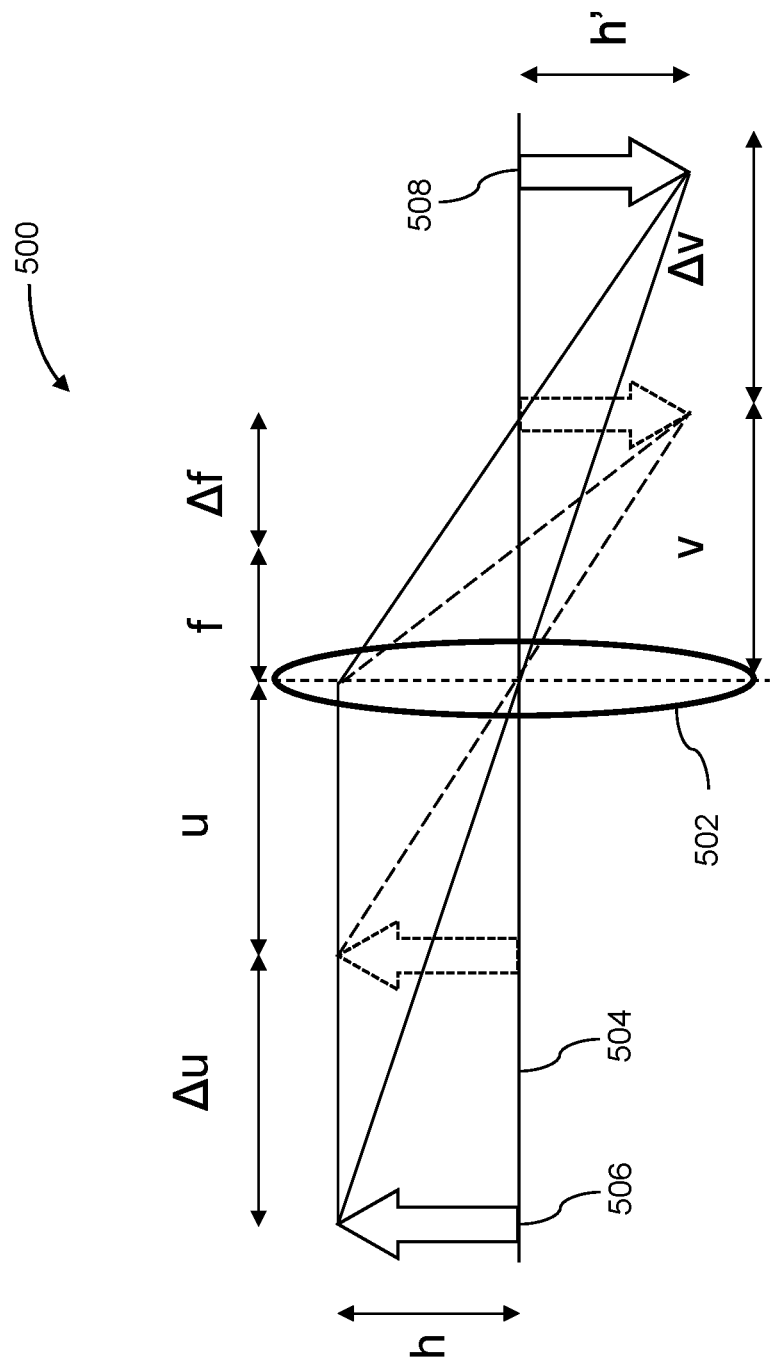
FIG. 5 illustrates a simplified model for calculating the change in focal length and image distance, in accordance with embodiments.

FIG. 5 illustrates a simplified model 500 for calculating the change in focal length and image distance, in accordance with embodiments. The model 500 includes an optical assembly (represented herein as a single lens 502) with an optical axis 504. A target object 506 having a height h is imaged at a first object distance u and a second object distance u+Δu, resulting in a corresponding image 508 having a height h' located at a first image distance v and a second image distance v+Δv, respectively. In order to keep the height h' of the image 508 constant, the focal length of the optical assembly is f changed from f+Δf. Accordingly, the following relationships can be obtained:

$$\frac{h}{u} = \frac{h'}{v}$$

$$\frac{h}{f} = \frac{h'}{v - f}$$

which yield:

$$\frac{h}{u + \Delta u} = \frac{h'}{v + \Delta v}$$

$$\frac{h}{f + \Delta f} = \frac{h'}{(v + \Delta v) - (f + \Delta f)}$$

h and h' can be eliminated to obtain:

$$\Delta v = \frac{v}{u}(u + \Delta u) - v$$

$$\Delta f = \frac{v(u + \Delta u)}{u + v} - f$$

The values of the initial image distance v and focal length f are known from the initial focusing performed in step 310. The initial object distance u and the change in object distance Δu, can be calculated as previously described for the fixed focal length device. Accordingly, the values of Δv and Δf can be determined. Δv can be used to determine the adjustments to focusing parameters, while Δf represents the adjustments to the focal length.

In some embodiments, the approaches described herein can also accommodate movement of the target object relative to the movable object and/or imaging device. For example, the method 300 can involve receiving tracking information indicative of movement of the target object relative to the movable object and/or imaging device, and step 340 can further involve modifying the one or more parameters based on the tracking information. In some embodiments, the tracking information is generated based on image data of the target object captured by the imaging device, e.g., using a tracking algorithm that monitors the location and/or size of the target object within the image data. In some embodiments, movement of the target object relative to the movable object and/or imaging device results in a change in the size (e.g., length, width, height) of the target object within the image data, and the size information can be used to determine the amount of movement. For example, if the target object has a first height H1 within an image obtained at a first time point and a second height H2 within an image obtained at a second time point, the change in object distance Δu between the two time points can be determined as follows:

$$\Delta u = \frac{H1 - H2}{H1} u$$

Optionally, step 340 can further include determining a rate at which the one or more parameters should be modified. In some embodiments, it may be desirable to gradually increase or decrease the value of the parameter, rather than directly setting the parameter to the modified value. The rate profile may also be determined based on the change in spatial disposition and/or spatial relationship.

In step 350, image data is generated using the imaging device with the modified one or more parameters determined in step 340. In some embodiments of the method 300, step 350 is omitted, such that the method 300 can be performed without generating the image data.

Some or all of the steps of the method 300 can be repeated continuously or at predetermined time intervals in order to provide dynamic adjustments to the imaging parameters (e.g., focus, focal length). For example, steps 320-340 can be repeated at a rate of about 30 Hz, or within a range from about 10 Hz to about 50 Hz, during the operation of the movable object.

The method 300 provides various advantages compared to other approaches for setting one or more parameters of an imaging device. For example, the method 300 enables adjustments to focusing without imaging the target object or varying the focus of the imaging device in order to identify an optimal focus position, which may improve focusing speed. As another example, the method 300 can be performed without using a sensor that detects the distance between the target object and the imaging device, which may reducing the hardware and space requirements. Some or all of the steps of the method 300 can be performed automatically without using input from a user, which may improve ease of use.

Figure 6:
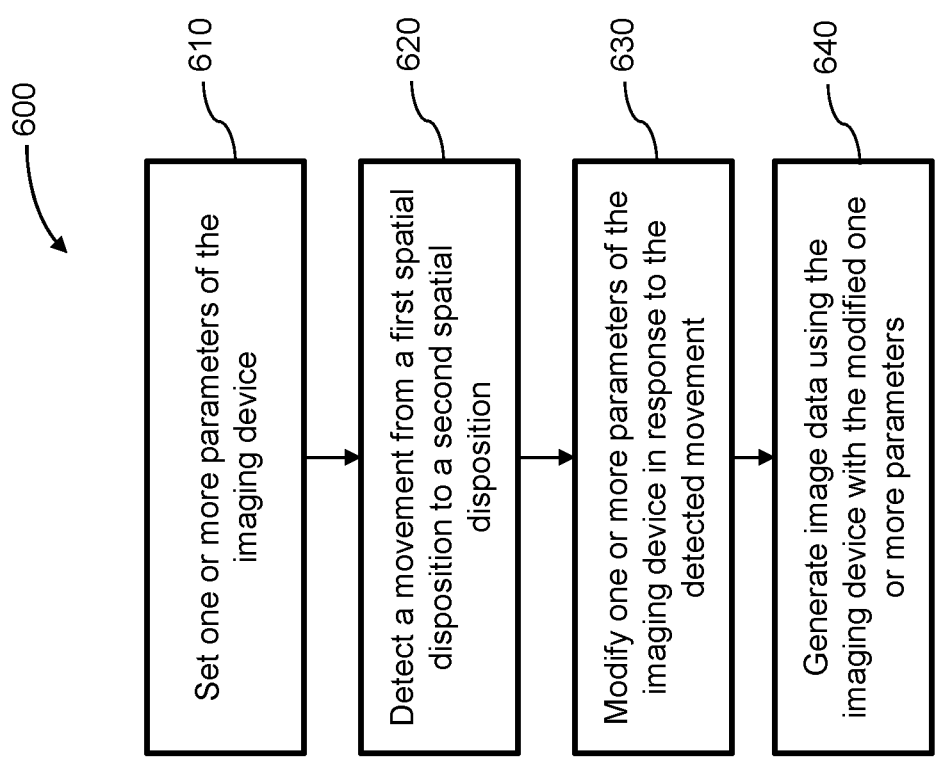
FIG. 6 illustrates a method for imaging a target object using an imaging device carried by a movable object, in accordance with embodiments.

FIG. 6 illustrates a method 600 for imaging a target object using an imaging device carried by a movable object, in accordance with embodiments. The method 600 can be performed using any embodiment of the systems and devices described herein. In some embodiments, some or all of the steps of the method 600 are performed with the aid of one or more processors (e.g., carried onboard the movable object and/or the imaging device).

In step 610, one or more parameters of the imaging device are set. The parameters can include one or more of: focus, focal length, zoom level, aperture size, exposure time, shutter speed, lens speed, imaging mode, white balance, ISO, or flash. In some embodiments, step 610 involves receiving an initial value for each of the one or more parameters, and setting each of the parameters to the respective initial value. The initial value can be input by a user, e.g., via a remote terminal in communication with the movable object and/or imaging device. Alternatively, the initial value can be determined automatically.

For example, in some embodiments, the one or more parameters are set in order to focus the imaging device on the target object when the imaging device and/or movable object is in first spatial disposition. The focusing can be performed as previously described herein with respect to the step 310 of the method 300.

Alternatively or in combination, in some embodiments, the one or more parameters are set such that the imaging device has a certain field of view or zoom level when the imaging device and/or movable object is in first spatial disposition, as previously described herein with respect to the step 310 of the method 300.

In some embodiments of the method 600, step 610 is omitted, such that the method 600 can be performed without setting initial values for the parameter(s).

In step 620, a movement of the imaging device and/or movable object from a first spatial disposition to a second spatial disposition is detected. The first spatial disposition may or may not be the same spatial disposition as in step 610. The first spatial disposition may differ from the second spatial disposition with respect to position (e.g., longitude, latitude, and/or altitude) and/or orientation (e.g., roll angle, pitch angle, and/or yaw angle). In some embodiments, the movement is detected by comparing position and/or orientation data from the first spatial disposition and the second spatial disposition. Detecting the movement can involve determining a movement distance and/or a movement direction from the first spatial disposition to the second spatial disposition.

In some embodiments, the movement of the imaging device and/or movable object is detected using one or more sensors. The sensors can include any of the sensors previously described herein with respect to step 320 of the method 300. Optionally, a sensor fusion algorithm can be used to process data from each of a plurality of different sensor types (e.g., GPS sensors, inertial sensors, vision sensors, and/or altitude sensors) in order to detect the movement.

In step 630, one or more parameters of the imaging device are modified in response to the detected movement. The parameters can include one or more of: focus, focal length, zoom level, aperture size, exposure time, shutter speed, lens speed, imaging mode, white balance, ISO, or flash. The modified parameters can be the same parameters that were initially set in step 610, or can be different parameters.

For example, in some embodiments, the one or more parameters are modified such that the imaging device is focused on the target object when the imaging device and/or movable object is in the second spatial disposition. Optionally, the imaging device may have been previously focused on the target object (e.g., in step 610), and step 630 can involve modifying the one or more parameters to maintain the focusing. In some embodiments, the detected movement is used to modify the focus of the imaging device, such as by modifying the distance between the optical center of the optical assembly of the imaging device and the image sensor of the imaging device, in order to focus the imaging device on the target object. Step 630 can further involve determining the modification to the one or more parameters (e.g., focus) in order to focus the imaging device on the target object, based on the detected movement. The determination can be performed as previously described herein with respect to step 340 of the method 300.

As another example, in some embodiments, the one or more parameters are modified in order to maintain a field of view of the imaging device when the imaging device and/or movable object is in the second spatial disposition. Optionally, the field of view of the imaging device may have been previously set (e.g., in step 610), and step 630 can involve modifying the one or more parameters to maintain the field of view. In some embodiments, the detected movement is used to modify the focal length of the imaging device, e.g., by varying the configuration of the zoom optics of the optical assembly. Step 630 can further involve determining the modification to the one or more parameters (e.g., focal length) in order to maintain the field of view, based on the detected movement. The determination can be performed as previously described herein with respect to step 340 of the method 300.

In some embodiments, the approaches described herein can also accommodate movement of the target object relative to the movable object and/or imaging device. For example, the method 600 can involve receiving tracking information indicative of movement of the target object relative to the movable object and/or imaging device, and step 630 can further involve modifying the one or more parameters based on the tracking information. In some embodiments, the tracking information is generated based on image data of the target object captured by the imaging device, e.g., using a tracking algorithm that monitors the location and/or size of the target object within the image data. In some embodiments, movement of the target object relative to the movable object and/or imaging device results in a change in the size (e.g., length, width, height) of the target object within the image data, and the size information can be used to determine the amount of movement. The determination can be performed as previously described herein with respect to step 340 of the method 300.

Optionally, step 630 can further include determining a rate at which the one or more parameters should be modified. In some embodiments, it may be desirable to gradually increase or decrease the value of the parameter, rather than directly setting the parameter to the modified value. The rate profile may also be determined based on the change in spatial disposition and/or spatial relationship.

In some embodiments, step 630 can be performed without imaging the target object or varying the focus of the imaging device in order to identify an optimal focus position, which may improve focusing speed. In some embodiments, step 630 can be performed without using a sensor that detects the distance between the target object and the imaging device, which may reducing the hardware and space requirements. Step 630 can be performed automatically without using input from a user, which may improve ease of use.

In step 640, image data is generated using the imaging device with the modified one or more parameters determined in step 630. In some embodiments of the method 600, step 640 is omitted, such that the method 300 can be performed without generating the image data.

Some or all of the steps of the method 600 can be repeated continuously or at predetermined time intervals in order to provide dynamic adjustments to the imaging parameters (e.g., focus, focal length). For example, steps 620-630 can be repeated at a rate of about 30 Hz, or within a range from about 10 Hz to about 50 Hz, during the operation of the movable object.

Figure 7:
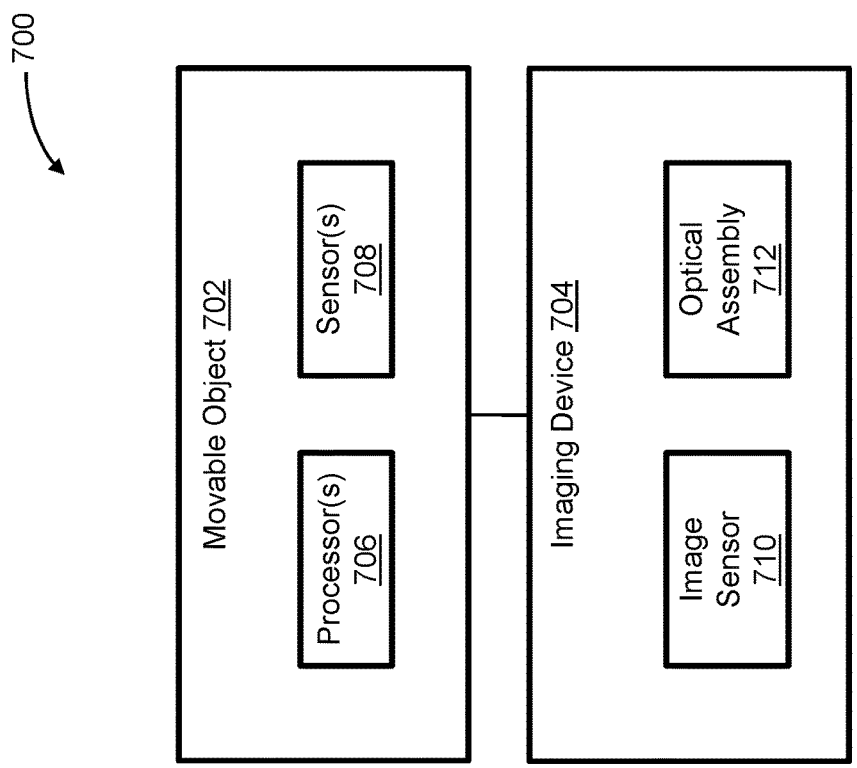
FIG. 7 schematically illustrates a system for imaging a target object, in accordance with embodiments.
Figure 8:
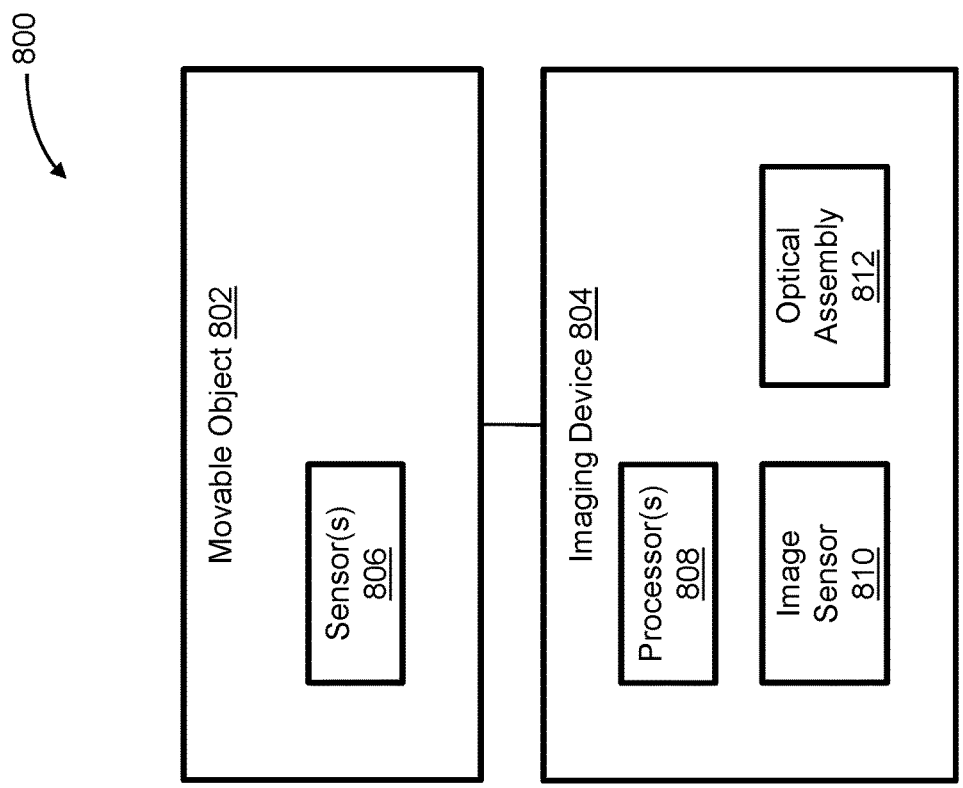
FIG. 8 schematically illustrates a system for imaging a target object, in accordance with embodiments.
Figure 9:
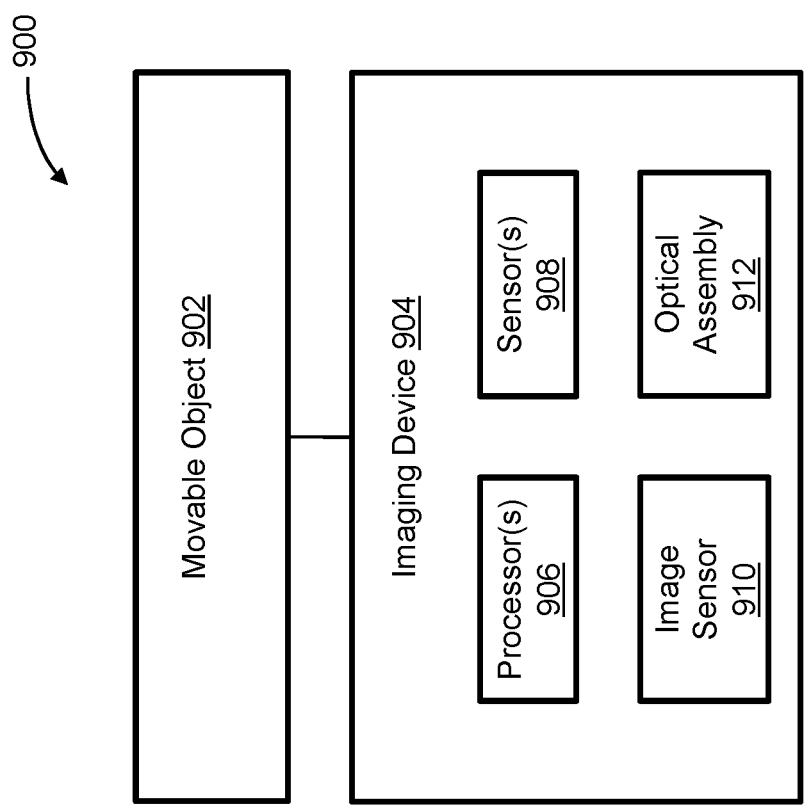
FIG. 9 schematically illustrates a system for imaging a target object, in accordance with embodiments.

FIG. 7 through FIG. 9 illustrate exemplary systems that may be used to perform any embodiment of the methods described herein.

FIG. 7 schematically illustrates a system 700 for imaging a target object, in accordance with embodiments. The system 700 includes a movable object 702 and an imaging device 704 carried by the movable object. The movable object 702 can include one or more processors 706 and one or more sensors 708. The imaging device 704 can include an image sensor 710 for generating image data of the target object and an optical assembly 712 for focusing light onto the image sensor 710. In some embodiments, the one or more sensors 708 of the movable object 702 are used to detect motion information of the movable object 702, such as a movement of the movable object 702 from a first spatial disposition to a second spatial disposition.

In some embodiments, the one or more processors 706 of the movable object 702 are configured to perform any embodiment of the methods described herein, such as the method 300 or the method 600. For example, the one or more processors 706 can receive and process the motion information from the sensor(s) 708 in order to determine modifications to one or more parameters of the imaging device 704. The one or more processors 706 can be operably coupled to the imaging device 704 in order to transmit control signals that cause the imaging device 704 to implement the determined modifications (e.g., by adjusting the configuration of the optical assembly 712). The one or more processors 706 can be operably coupled to the imaging device 704 in order to receive image data generated by the imaging device 704. Optionally, the one or more processors 706 can be in communication with a remote terminal (not shown) in order to receive control signals from the terminal and/or transmit image data to the terminal.

FIG. 8 schematically illustrates a system 800 for imaging a target object, in accordance with embodiments. The system 800 includes a movable object 802 and an imaging device 804 carried by the movable object. The movable object 802 can include one or more sensors 806. The imaging device 804 can include one or more processors 808, an image sensor 810 for generating image data of the target object, and an optical assembly 812 for focusing light onto the image sensor 810. In some embodiments, the one or more sensors 806 of the movable object 802 are used to detect motion information of the movable object 802, such as a movement of the movable object 802 from a first spatial disposition to a second spatial disposition.

In some embodiments, the one or more processors 808 of the imaging device 804 are configured to perform any embodiment of the methods described herein, such as the method 300 or the method 600. The one or more processors 808 can receive and process the motion information from the sensor(s) 806 in order to determine modifications to one or more parameters of the imaging device 804. The one or more processors 808 can generate control signals that cause the imaging device 804 to implement the determined modifications (e.g., by adjusting the configuration of the optical assembly 812). The one or more processors 808 can receive image data generated by the image sensor 810 of the imaging device 804. Optionally, the one or more processors 808 can be in communication with a remote terminal (not shown) in order to receive control signals from the terminal and/or transmit image data to the terminal.

FIG. 9 schematically illustrates a system 900 for imaging a target object, in accordance with embodiments. The system 900 includes a movable object 902 and an imaging device 904 carried by the movable object 902. The imaging device 904 can include one or more processors 906, one or more sensors 908, an image sensor 910 for generating image data of the target object, and an optical assembly 912 for focusing light onto the image sensor 910. In some embodiments, the one or more sensors 908 of the imaging device 904 are used to detect motion information of the imaging device 904, such as a movement of the imaging device 904 from a first spatial disposition to a second spatial disposition.

In some embodiments, the one or more processors 906 of the imaging device 904 are configured to perform any embodiment of the methods described herein, such as the method 300 or the method 600. The one or more processors 906 can receive and process the motion information from the sensor(s) 908 in order to determine modifications to one or more parameters of the imaging device 904. The one or more processors 906 can generate control signals that cause the imaging device 904 to implement the determined modifications (e.g., by adjusting the configuration of the optical assembly 912). The one or more processors 906 can receive image data generated by the image sensor 910 of the imaging device 912. Optionally, the one or more processors 906 can be in communication with a remote terminal (not shown) in order to receive control signals from the terminal and/or transmit image data to the terminal.

It shall be appreciated that the embodiments illustrated in FIGS. 7 through 9 are provided as examples only and are not intended to be limiting. One of ordinary skill in the art would recognize that the configuration of the various components of the systems 700, 800, and 900 can be varied as desired. For example, the locations of the components can be varied, e.g., such that components illustrated as being located in the movable object may instead be located in the imaging device, and vice-versa. Some components may be combined with other components. Alternatively, some components may be divided into sub-components, and the location of the sub-components can be varied as desired.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
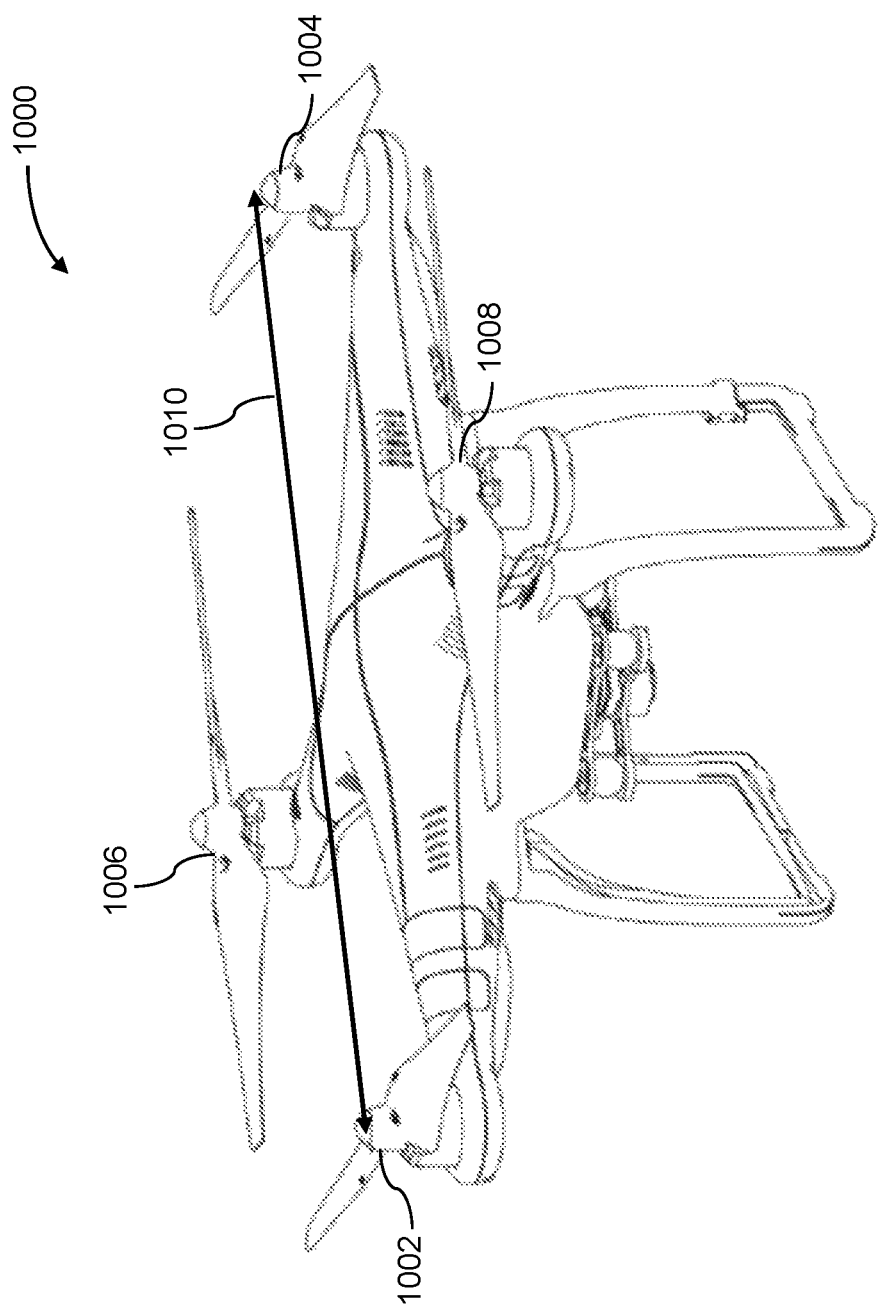
FIG. 10 illustrates a UAV, in accordance with embodiments.

FIG. 10 illustrates an unmanned aerial vehicle (UAV) 1000, in accordance with embodiments of the present invention. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
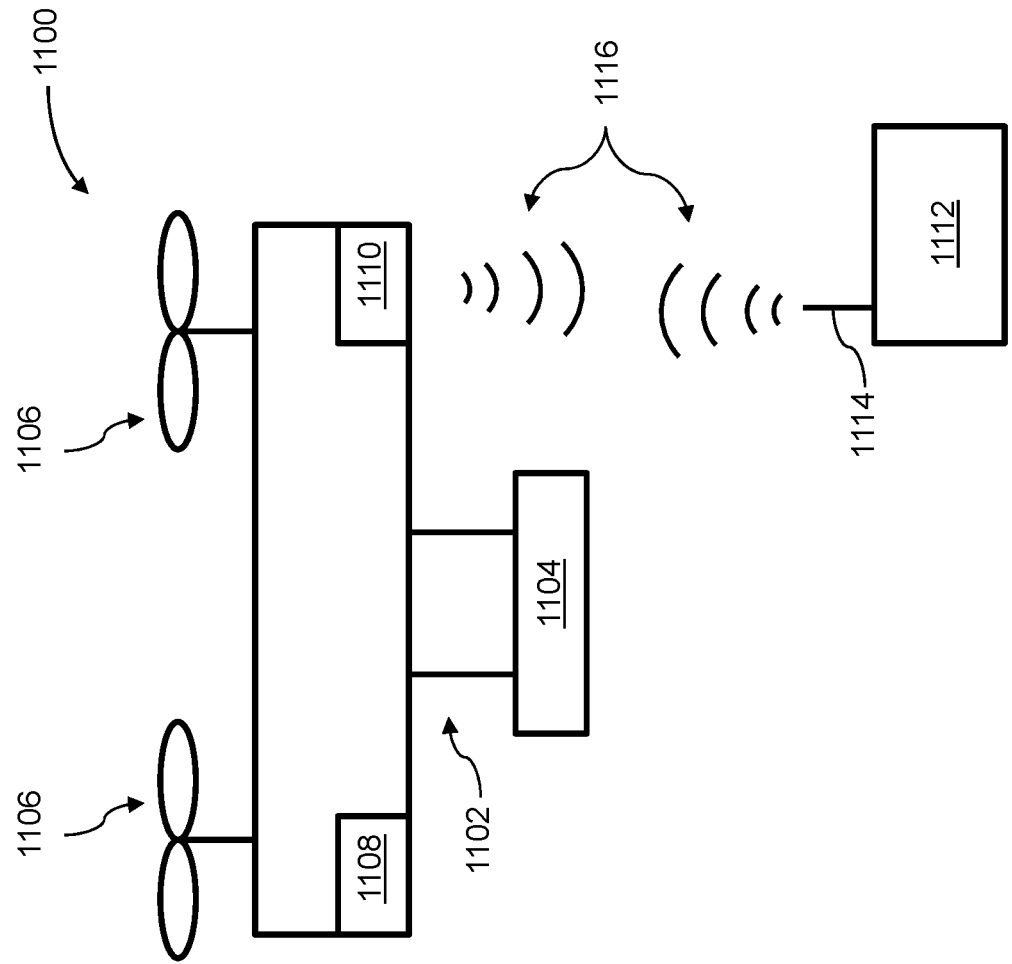
FIG. 11 illustrates a movable object including a carrier and a payload, in accordance with embodiments.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
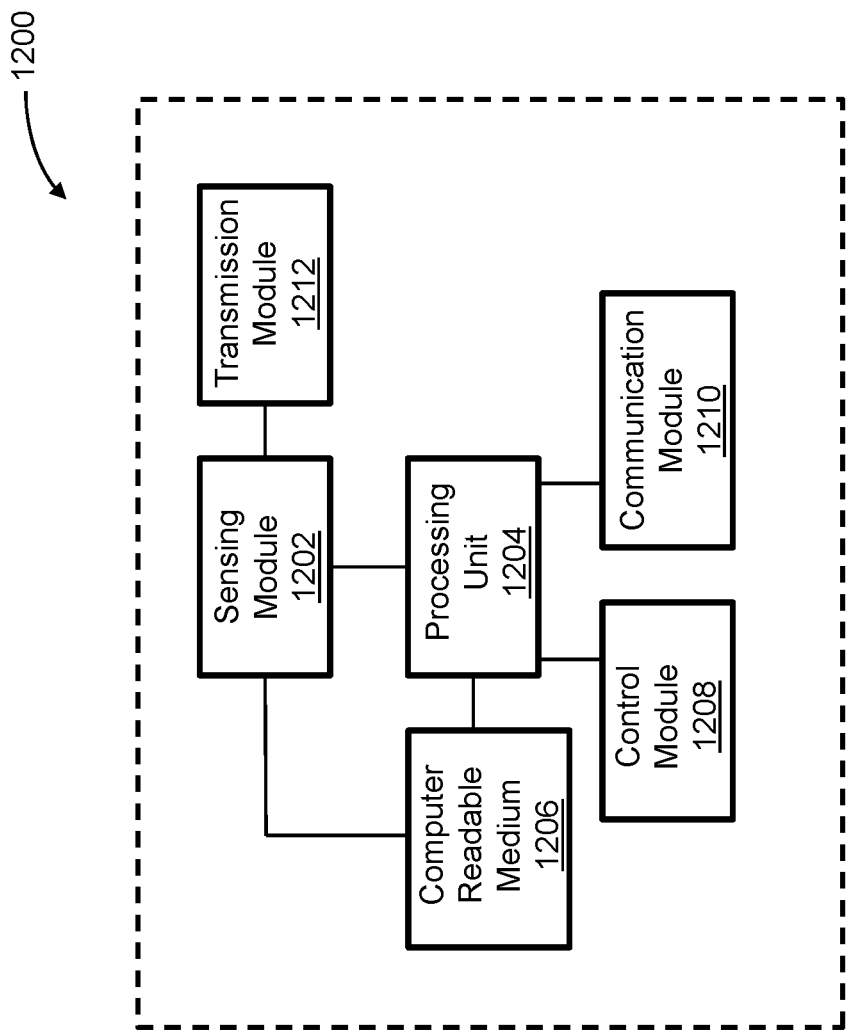
FIG. 12 illustrates a system for controlling a movable object, in accordance with embodiments.

FIG. 12 is a schematic illustration by way of block diagram of a system 1200 for controlling a movable object, in accordance with embodiments. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for imaging a target object using an imaging device carried by a movable object, the system comprising:
one or more sensors onboard the movable object, wherein the one or more sensors are configured to detect motion information for the movable object; and
one or more processors onboard the movable object, wherein the one or more processors are configured to:
receive, from the one or more sensors, the motion information for the movable object;
determine, based on the motion information, a change in a spatial relationship between the movable object and the target object; and
modify one or more parameters of the imaging device based on the determined change in the spatial relationship between the movable object and the target object such that the imaging device is focused on the target object.

2. The system of claim 1, wherein the motion information comprises one or more of: a translational velocity, a translational acceleration, an angular velocity, an angular acceleration, a position at a current time point, an orientation at a current time point, a position at a previous time point, or an orientation at a previous time point.

3. The system of claim 1, wherein the spatial relationship between the movable object and the target object comprises a distance between the movable object and the target object.

4. The system of claim 1, wherein the one or more parameters comprise a distance between an optical center of an optical assembly of the imaging device and an image sensor of the imaging device or a focal length of the imaging device.

5. The system of claim 1, wherein the one or more parameters are modified so as to maintain a field of view of the imaging device.

6. A movable object comprising the system of claim 1, wherein the movable object is an unmanned aerial vehicle.

7. A method for imaging a target object using an imaging device carried by a movable object, the method comprising:
   detecting, using one or more sensors onboard the movable object, motion information of the movable object;
   determining, based on the motion information and with aid of one or more processors onboard the movable object, a change in a spatial relationship between the movable object and the target object; and
   modifying, with aid of the one or more processors, one or more parameters of the imaging device based on the determined change in the spatial relationship between the movable object and the target object such that the imaging device is focused on the target object.

8. The method of claim 7, wherein the spatial relationship between the movable object and the target object comprises a distance between the movable object and the target object.

9. The method of claim 7, wherein the one or more parameters comprise a distance between an optical center of an optical assembly of the imaging device and an image sensor of the imaging device or a focal length of the imaging device.

10. The method of claim 7, wherein the one or more parameters are modified so as to maintain a field of view of the imaging device.

11. The method of claim 7, further comprising receiving tracking information indicative of movement of the target object relative to the movable object, wherein the change in spatial relationship is determined based on the tracking information.

12. The method of claim 7, further comprising generating image data of the target object using the imaging device with the one or more modified parameters.

13. An imaging device configured to be carried by a movable object for imaging a target object, the imaging device comprising:
   one or more processors configured to:
      receive, from one or more sensors mounted on or in the movable object, motion information for the movable object;
      determine, based on the motion information, a change in a spatial relationship between the movable object and the target object; and
      modify one or more parameters of the imaging device based on the determined change in the spatial relationship between the movable object and the target object such that the imaging device is focused on the target object.

14. The imaging device of claim 13, wherein the movable object is an unmanned aerial vehicle.

15. The imaging device of claim 13, wherein the motion information comprises one or more of: a translational velocity, a translational acceleration, an angular velocity, an angular acceleration, a position at a current time point, an orientation at a current time point, a position at a previous time point, or an orientation at a previous time point.

16. The imaging device of claim 13, wherein the spatial relationship between the movable object and the target object comprises a distance between the movable object and the target object.

17. The imaging device of claim 13, further comprising an optical assembly and an image sensor, wherein the one or more parameters comprise a distance between an optical center of the optical assembly and the image sensor or a focal length of the optical assembly.

18. The imaging device of claim 13, further comprising an optical assembly having a field of view, wherein the one or more parameters are modified so as to maintain the field of view of the optical assembly.

19. The imaging device of claim 13, wherein the one or more processors are further configured to receive tracking information indicative of movement of the target object relative to the movable object, wherein the change in spatial relationship is determined based on the tracking information.

20. The imaging device of claim 13, wherein the one or more processors are further configured to generate image data of the target object according to the one or more modified parameters.

* * * * *